(12) United States Patent
Lovett et al.

(10) Patent No.: US 12,523,214 B2
(45) Date of Patent: Jan. 13, 2026

(54) AIR COMPRESSION SYSTEM

(71) Applicants: Robert Ray Lovett, Finger, TN (US); Donna Michelle Lovett, Finger, TN (US)

(72) Inventors: Robert Ray Lovett, Finger, TN (US); Donna Michelle Lovett, Finger, TN (US)

( * ) Notice: Subject to any disclaimer, the term of this patent is extended or adjusted under 35 U.S.C. 154(b) by 0 days.

(21) Appl. No.: 18/445,023

(22) Filed: Mar. 9, 2023

(65) Prior Publication Data

US 2024/0301822 A1     Sep. 12, 2024

Related U.S. Application Data

(60) Provisional application No. 63/372,993, filed on Apr. 22, 2022.

(51) Int. Cl.
    *F04B 43/08*      (2006.01)
    *F03G 7/00*      (2006.01)
     (Continued)

(52) U.S. Cl.
CPC ............ *F04B 43/08* (2013.01); *F03G 7/0252* (2021.08); *F03G 7/122* (2021.08); *F04B 43/113* (2013.01)

(58) Field of Classification Search
CPC ........ F02C 6/16; F03G 7/122; F04B 43/1136; F04B 43/084; F04B 43/10; F04B 43/113; F04B 43/1133
See application file for complete search history.

(56) References Cited

U.S. PATENT DOCUMENTS

| | | | | |
|---|---|---|---|---|
| 3,048,121 A | * | 8/1962 | Sheesley | ............ F04B 43/0072 91/193 |
| 3,526,223 A | * | 9/1970 | Curtis | ...................... B64G 6/00 165/104.31 |

(Continued)

FOREIGN PATENT DOCUMENTS

| | | | | |
|---|---|---|---|---|
| CA | 2783063 A1 | * | 1/2014 | ............. F04B 43/06 |
| DE | 19726220 A1 | * | 12/1998 | ............ F04B 43/084 |

(Continued)

OTHER PUBLICATIONS

Machine translation of DE-102021002100-A1, accessed Feb. 6, 2024. (Year: 2024).*

*Primary Examiner* — Jonathan R Matthias
(74) *Attorney, Agent, or Firm* — Filament Legal, PLLC; Maurice Williams (57) ABSTRACT

An air compressor system includes: two or more compressed air tanks previously filled with compressed air; several compression chambers also filled with compressed air, each containing a small internal expandable tube; located inside a larger external heavy-walled tube bonded to endcaps containing one-way and two-way valves, rigidly attached to top and bottom outside tanks; a timed valve inside expandable tube allowing compressed air from top tank to expand that tube to inside of heavy-walled tube, compressing ambient air outside expandable tube that entered through one-way valves. A second timed valve opens, forcing the original air back into the tank bottom or for immediate use or storage. Several other compression chambers follow the same procedure nonstop, increasing the psi in tank for immediate use or storage. All FIG. 1A compression chambers share two common tanks, which fill from top tank 600 and empty in bottom tank 602 in sequence.

9 Claims, 8 Drawing Sheets

(51) Int. Cl.
*F03G 7/10* (2006.01)
*F04B 43/113* (2006.01)

(56) References Cited

U.S. PATENT DOCUMENTS

| | | | | |
|---|---|---|---|---|
| 3,630,644 | A | * | 12/1971 | Bellhouse ............... F04B 43/10 417/389 |
| 4,741,678 | A | * | 5/1988 | Nehring .................. F04B 43/14 417/395 |
| 5,273,406 | A | * | 12/1993 | Feygin .................... F04B 43/10 417/474 |
| 2007/0175927 | A1 | * | 8/2007 | Ozanne ................. F04B 43/113 99/279 |
| 2009/0309371 | A1 | * | 12/2009 | Ballard ..................... F03G 7/10 290/1 R |
| 2020/0038565 | A1 | * | 2/2020 | Vargas Fonseca .. A61M 60/441 |

FOREIGN PATENT DOCUMENTS

| | | | | |
|---|---|---|---|---|
| DE | 102021002100 | A1 | * | 10/2022 |
| KR | 20040080308 | A | * | 9/2004 ............. F03G 3/096 |
| KR | 20050027285 | A | * | 3/2005 ............. F03G 3/096 |
| WO | WO-2005073553 | A2 | * | 8/2005 ............. F03G 5/103 |
| WO | WO-2009081086 | A1 | * | 7/2009 ............. F03G 4/074 |
| WO | WO-2009147464 | A1 | * | 12/2009 ............. F03G 7/104 |
| WO | WO-2018083707 | A1 | * | 5/2018 |
| WO | WO-2021251836 | A1 | * | 12/2021 |

* cited by examiner

FIG. 2B
VIEW A-A

FIG. 3

| Step |
|---|
| Startup for (16) FIG. 1A Compression Chambers |
| Remove all protective covers from valves |
| Fill (10) Chambers with 10,000-psi atmospheric gas |
| Fill (6) Chambers with atmospheric gas |
| Fill Tank 600 with 50,000-psi gas |
| Fill Tank 602 with 80,000-psi gas |
| Confirm H2O level per specifications for each model |
| Open one-way valve 400 on all chambers |
| Turn on computer and set for two minute activations |
| Monitor system for a minimum of four hours confirming all 400 One-way valves are open |
| Monitor pressure in tanks 600 and 602 Turn Two-way valves on and off to confirm pressure remains constant in Tanks 600 and 602 |

AIR COMPRESSION SYSTEM

This application claims the benefit under 35 USC 119 (e) of provisional application Ser. No. 63/372,993, titled "A closed computerized system for compressing atmospheric gas, requiring no mechanical air compressor, electricity, or other external energy." Filed Apr. 22, 2022, by Robert Ray Lovett. All of the above listed US Patent and Patent Applications are incorporated herein by reference in their entirety.

BACKGROUND ART OF INVENTION

Technical Field

Often regarded as the fourth utility after electricity, natural gas, and water. Compressed air is widely used in manufacturing facilities. Compressed air is the most useful and underappreciated tool used in industry. Cost for air compressors can account for up to 30% of a manufacturing site's total electric bill. Only about 5-10% of the energy input to a compressor goes toward productive use of compressed air based on useful work delivered. A 1-HP compressed-air motor consumes several times as much energy as a comparable 1-HP electric motor. Accounting for the physics and thermodynamics involved in operating said motor, compressing air is naturally inefficient. What's needed is a more economical way to compress atmospheric air using less clean energy. This patent defines a new and inexpensive way of compressing ambient air to many times atmospheric pressure, which makes it more economical to use, also surpassing wind and solar because of those sources' site limitations and limited availability.

DESCRIPTION OF THE PRIOR ART

The first air compression came from our ancestor's human lungs to build fires followed by bellows, water wheels, then steam. The applicants found no past or current commercial air compression systems, that require no external energy to operate.

BRIEF DESCRIPTION

Briefly, the present invention describes a disruptive innovation for compressing ambient atmospheric air from 14.7-psi up to 10,000-psi or higher, its operation requiring neither traditional compressor nor electricity. Clean energy is required to prevent further contamination of our atmosphere. With the mobility market shifting to electric vehicles, there is insufficient energy from solar and wind to meet present and future demands.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

Figure 1A:
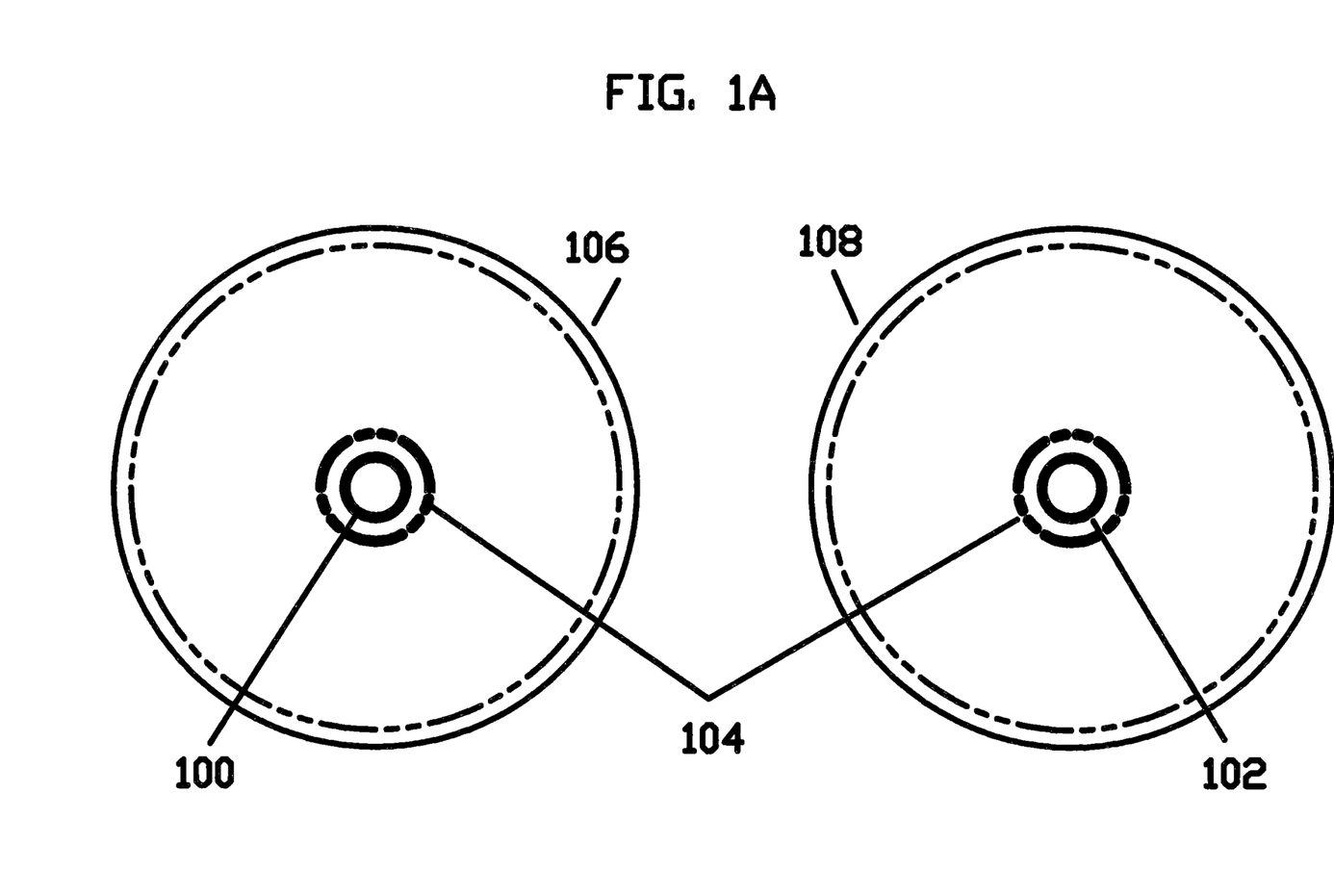
FIG. 1A illustrates an exemplary system top and bottom views 106 and 108 of compression chamber 302 for compressing ambient atmospheric air to 10,000 psi or higher. One-way valve 100 regulates the psi pressure from tank 600, whereas the two-way valve 102 regulates the pressure entering tank 602 or released for immediate use or storage.

Referring to FIG. 1A illustrates an exemplary closed computerized system for capturing and compressing ambient atmospheric air to a much higher psi for use in industry, utilizing previously stored compressed air as its sole energy source.

FIG. 1A illustrates a top- and bottom-end view of valves 100 and 102, bonded to end caps 106 and 108 respectively, which allows compressed air to enter from tank 600 and exit into tank 602. Expandable tube 104 (shown in normally closed position) allows 10,000-psi compressed air to flow into inside tube 104 from tank 600, compressing ambient air on outside of expandable tube 104 to 10,000-psi, which enters through one-way valves 300.

Figure 1B:
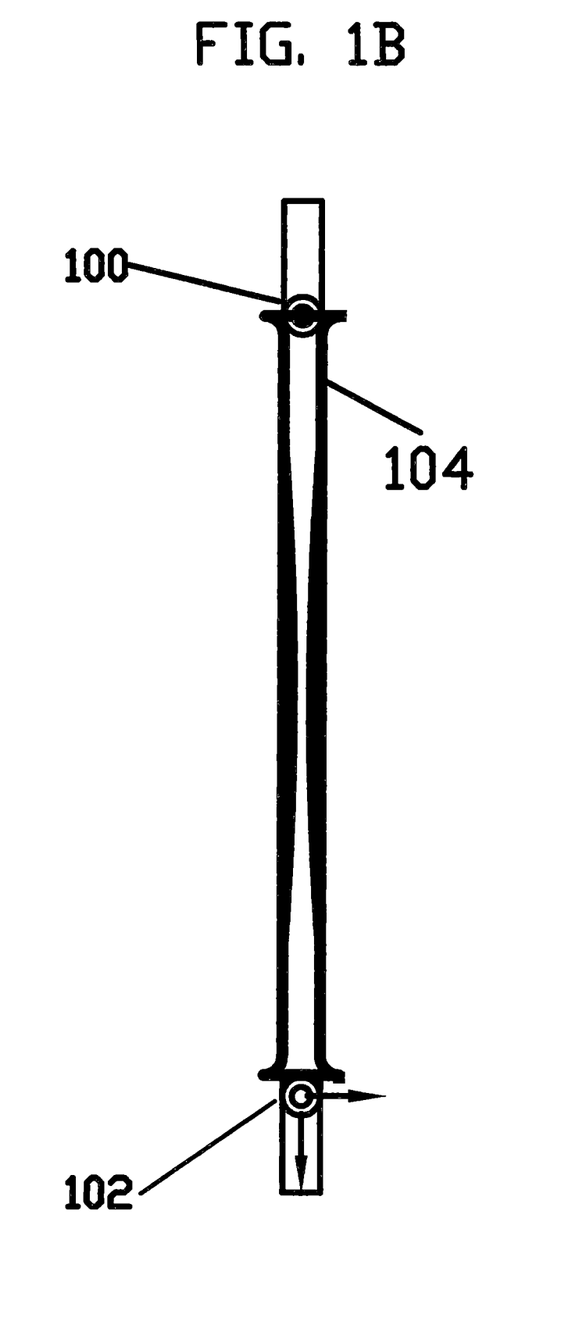
FIG. 1B illustrates an exemplary system side view (in a closed position) of an expandable tube 104, for compressing ambient atmospheric air by expanding and contracting through valves 100 and 102.

FIG. 1B illustrates a side view of expandable tube 104, which compresses ambient air to 10,000-psi inside compressor chamber 302. The center portion is designed to be stronger, utilizing springs, thicker material, material that holds or dissipates heat, or other creative ways, in order to force 10,000-psi gas out through two-way valve 102 into tank 602 or for immediate use or storage.

Figure 1C:
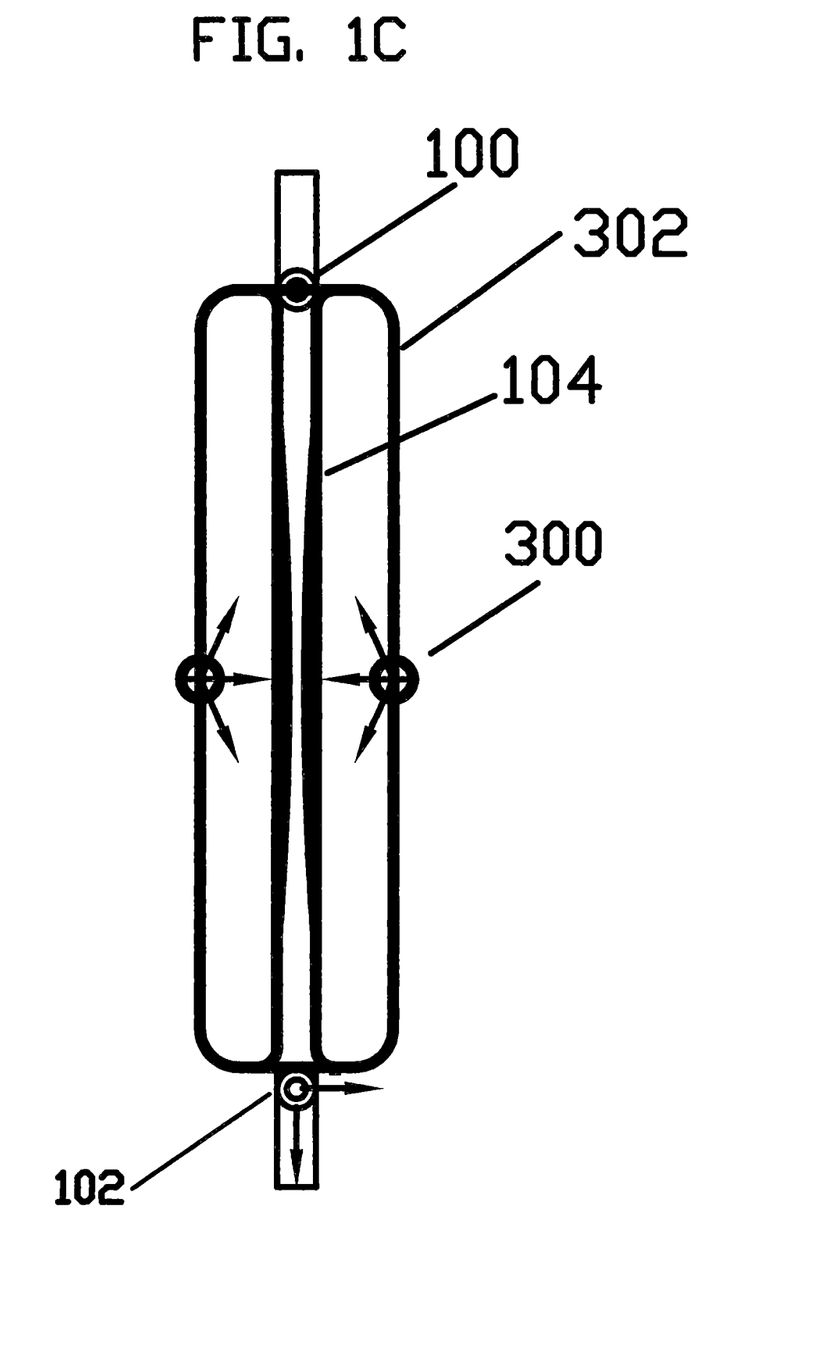
FIG. 1C illustrates an exemplary system with expandable tube 104, bonded inside compression chamber 302 (in a closed position). One-way valve 100 and two-way valve 102 allow entry and exit of high-pressure gas, whereas one-way valves 300 allow ambient air to enter compression chamber 302.

FIG. 1C illustrates one-way valves 300, which allow ambient air to enter inside chamber 302, filling all spaces around expandable tube 104 (in its closed position).

Figure 1D:
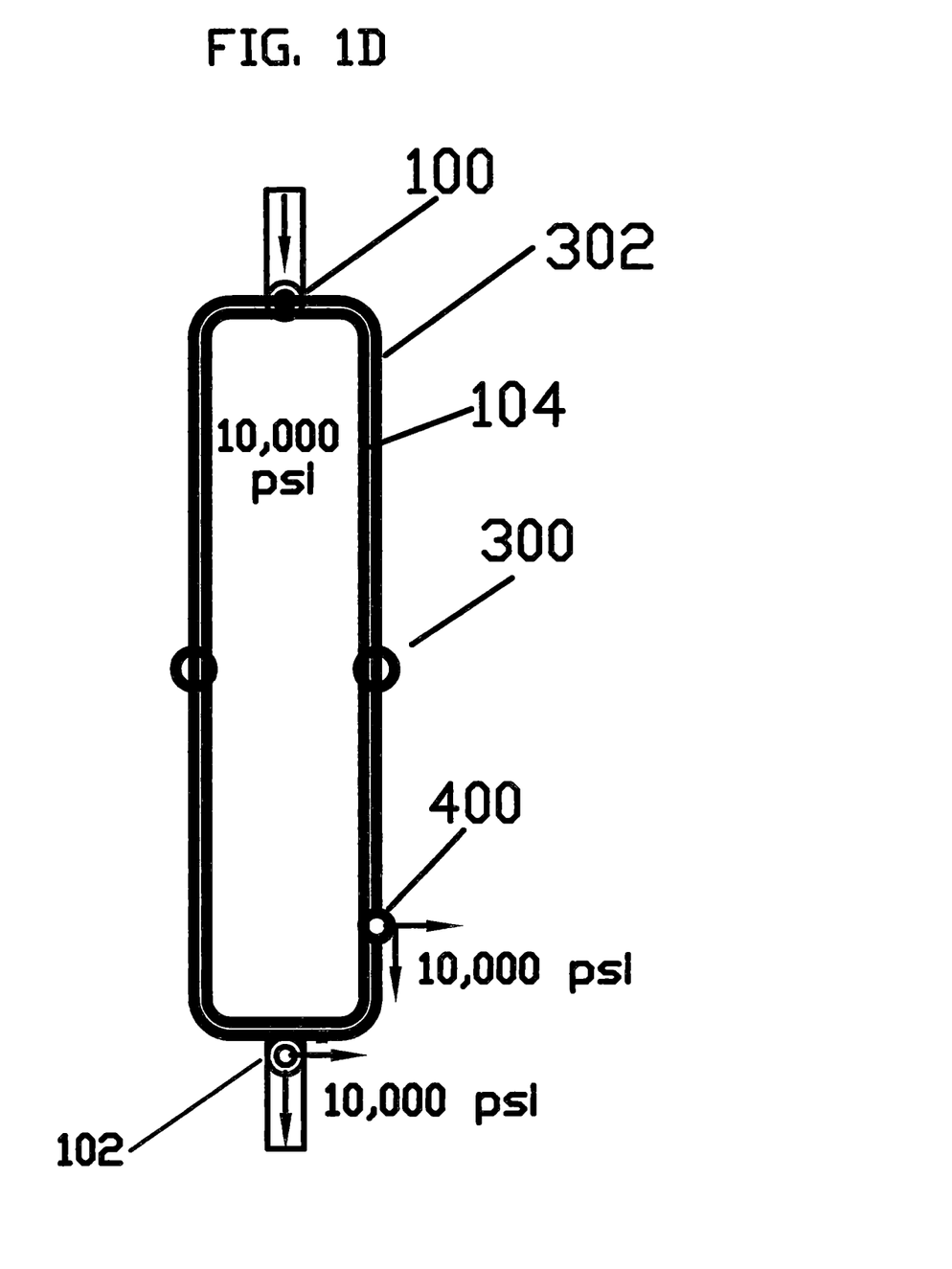
FIG. 1D illustrates an exemplary system where 10,000-psi compressed gas is forced into expandable tube 104, from tank 600 through one-way valve 100, compressing ambient air outside tube 104 to 10,000-psi, which entered through one-way valves 300. Compressed gas may then exit through two-way valve 400 for immediate use or storage, or into tank 602 to be reused for all future compression cycles.

FIG. 1D illustrates computer-opened two-way valve 400, allowing ambient air now 10,000 psi to be released for immediate use or storage for (CCUS) or (CAES), or flow into tank 602 to control heat buildup for steam for hydrogen electrolysis or to increase tank psi value.

Figure 1E:
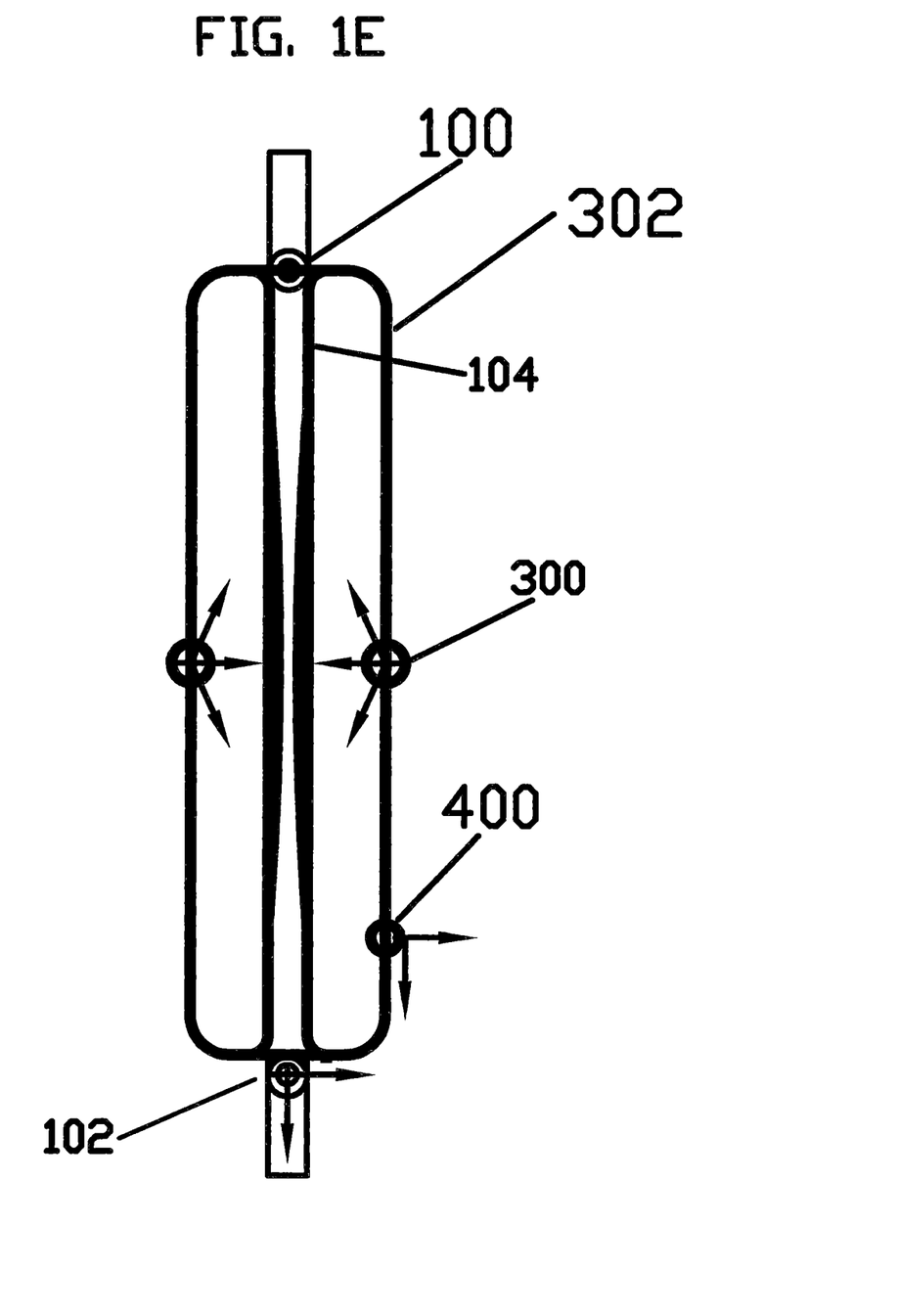
FIG. 1E illustrates expandable tube 104 returned to its (normally closed position), filling compression chamber 302 with new ambient air through one-way valves 300.

FIG. 1E illustrates expandable tube 104 closing to its (normally closed position), creating a vacuum inside compression chamber 302, which pulls in more ambient air through one-way valves 300. When used to power a pneumatic motor, the exhaust gas may also be diverted back into a FIG. 1A compression chamber 302 containing ambient air, through one-way valves 300, which has a much higher PSI than ambient air.

Figure 2A:
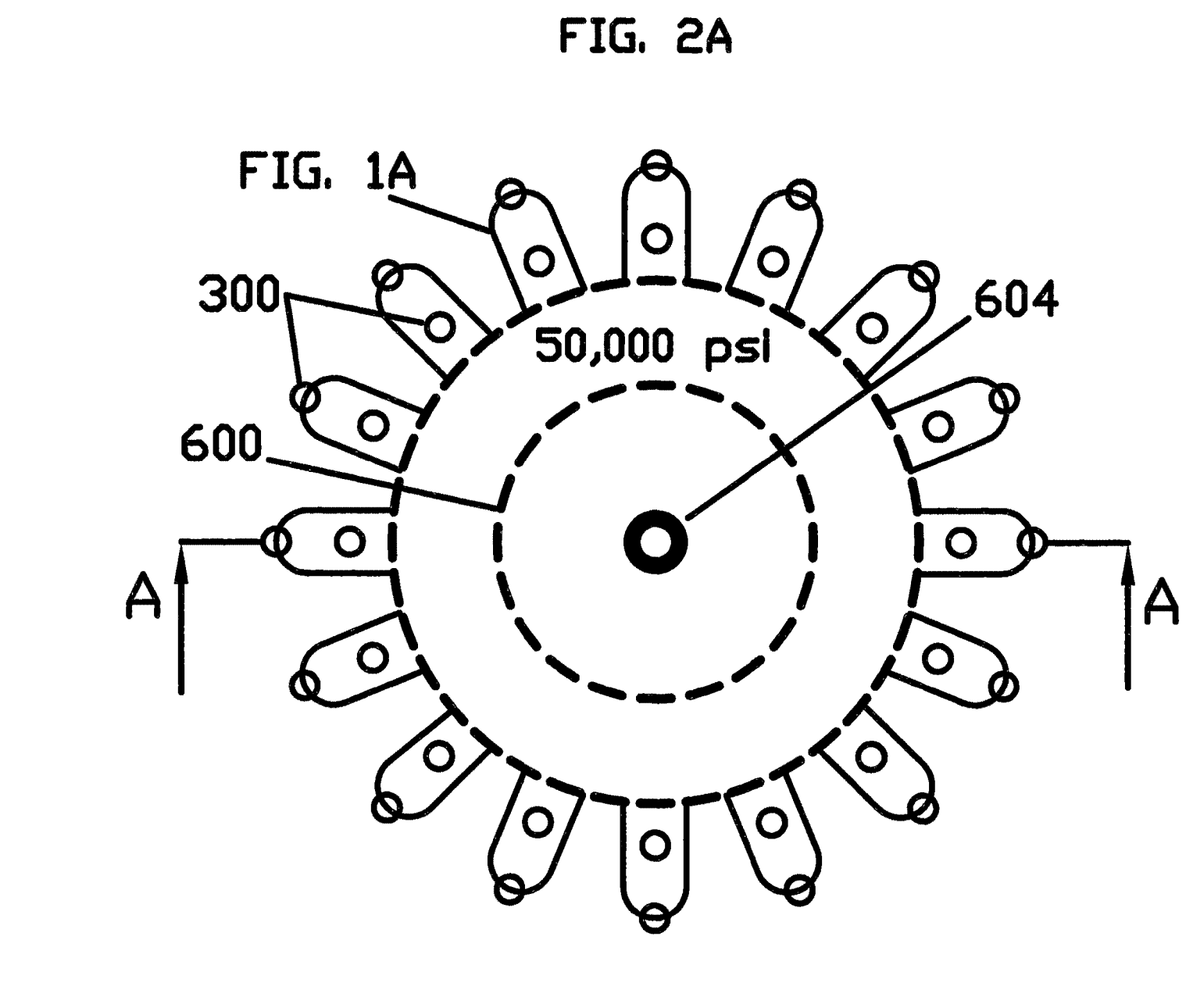
FIG. 2A details a top view of tank 600 with several FIG. 1A air compression chambers attached around periphery. Also shown are ambient air intake valves 300 and one-way valve 604.

FIG. 2A details a top view of tank 600, with several FIG. 1A compressor chambers: six containing ambient air, and ten containing 10,000-psi equally spaced around outside periphery where ambient air enters through one-way valves 300, into outer surface of expandable tube 104. One-way valve 604 controls the minimum 50,000-psi pressure in tank 600.

Figure 2B:
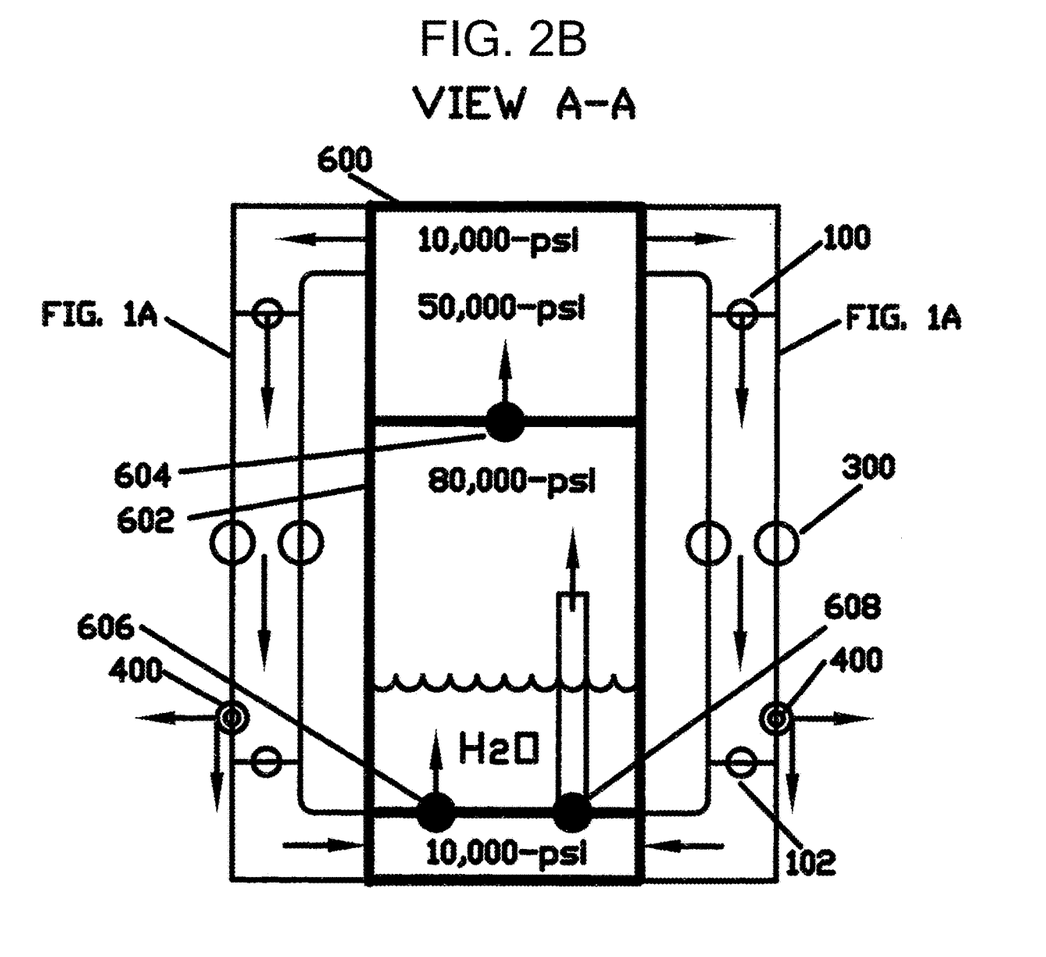
FIG. 2B details how one-way valve 100 allows entry of 10,000-psi compressed air into FIG. 1A at top of tank 600, whereas two-way valve 102 allows exit of 10,000-psi air into FIG. 1A at bottom of tank 602 for immediate use or storage.

FIG. 2B details one-way valve 100 in FIG. 1A opening, allowing entry of 10,000-psi compressed air from tank 600 into one or more FIG. 1A compression chambers 302, lowering the 50,000-psi normal operating pressure. Valve 604 automatically opens, allowing 80,000-psi pressure from tank 602 to flow into tank 600, bringing the pressure back to 50,000-psi, then closing. This process prevents a much higher psi in tank 602 and tank 600 from equalizing. Valve 606 and 608 may increase or decrease pressure and or temperature of compressed air for electrolysis.

Figure 3:
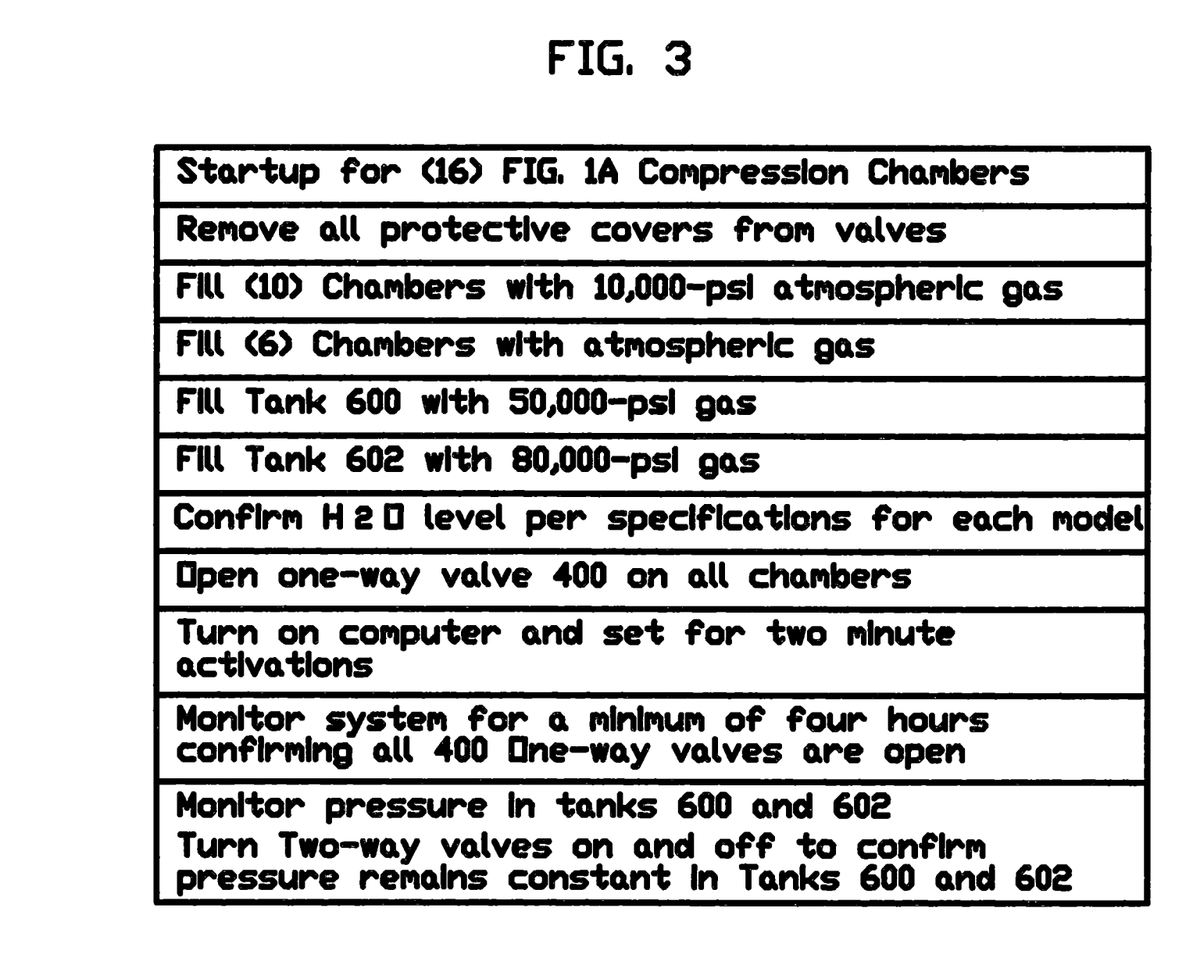
FIG. 3 shows a sixteen FIG. 1A compressor chamber installation.

FIG. 3 shows a sixteen FIG. 1A compressor chamber installation drawing including safety procedures.

All FIG. 1A compression chambers 302 connected to tank 600 and tank 602 open then close sequentially, which makes 100,000-psi pressure always available on demand from tank 602 to refill tank 600.

In a preferred embodiment, this model provides an ambient air compression system for carbon capture, use, and storage (CCUS).

In a preferred embodiment, this model provides an ambient air compression system for compressed air energy storage (CAES).

In a preferred embodiment, this model provides an ambient air compression system for spinning a pneumatic linear generator utilizing a pneumatic motor.

The invention claimed is:

1. An ambient air compression system comprising:
   a compression chamber having an interior and a periphery, the compression chamber configured to receive ambient air;
   an expandable tube positioned within the compression chamber and designed to remain in a closed configuration under normal conditions, the expandable tube being capable of expanding when exposed to high-pressure air and returning to its closed configuration under normal conditions, with expansion of the expandable tube compressing ambient air present in the compression chamber;
   a first high-pressure air tank configured to store high-pressure air;
   a first one-way valve operatively coupled to the first high-pressure air tank and to the compression chamber for delivering high-pressure air from the first high-pressure air tank to the expandable tube to cause the expansion of the expandable tube;
   a plurality of ambient air intake valves positioned along the periphery of the compression chamber, each ambient air intake valve being configured to allow ambient air to enter the compression chamber when the expandable tube is in the closed configuration;
   a second high-pressure air tank configured to store compressed ambient air at a pressure higher than ambient, the second high-pressure air tank being communicatively coupled to the compression chamber via a two-way valve, wherein the two-way valve selectively transfers compressed ambient air from the compression chamber to the second high-pressure air tank;
   wherein the first high-pressure air tank is connected to the second high-pressure air tank via a central valve centrally disposed with respect to the first and second high pressure air tanks; and
   wherein the ambient air compression system operates using previously stored compressed air.

2. The ambient air compression system of claim 1, further comprising:
   a second two-way valve configured to direct compressed air from the compression chamber to a valve outlet for immediate use.

3. The ambient air compression system of claim 1, wherein the ambient air intake valves are one-way valves.

4. The ambient air compression system of claim 1, wherein the expandable tube includes a central region reinforced with springs or heat-dissipating material.

5. The ambient air compression system of claim 1, wherein the expandable tube is bonded inside the compression chamber.

6. The ambient air compression system of claim 1, wherein a plurality of air compression chambers are attached around the periphery of the first and second high-pressure air tanks.

7. The ambient air compression system of claim 1, wherein the first one-way valve is bonded to a first end cap that allows compressed air to enter from the first high-pressure air tank.

8. The ambient air compression system of claim 1, wherein the two-way valve is bonded to a second end cap which allows compressed air to exit into the second high-pressure air tank.

9. The ambient air compression system of claim 1, wherein the central valve is a one-way valve.

\* \* \* \* \*